Sept. 3, 1968   W. AHLERT   3,399,585
APPARATUS FOR REMOVING EXCESS WELDING MATERIAL FROM RAIL WELDS
Filed March 14, 1966
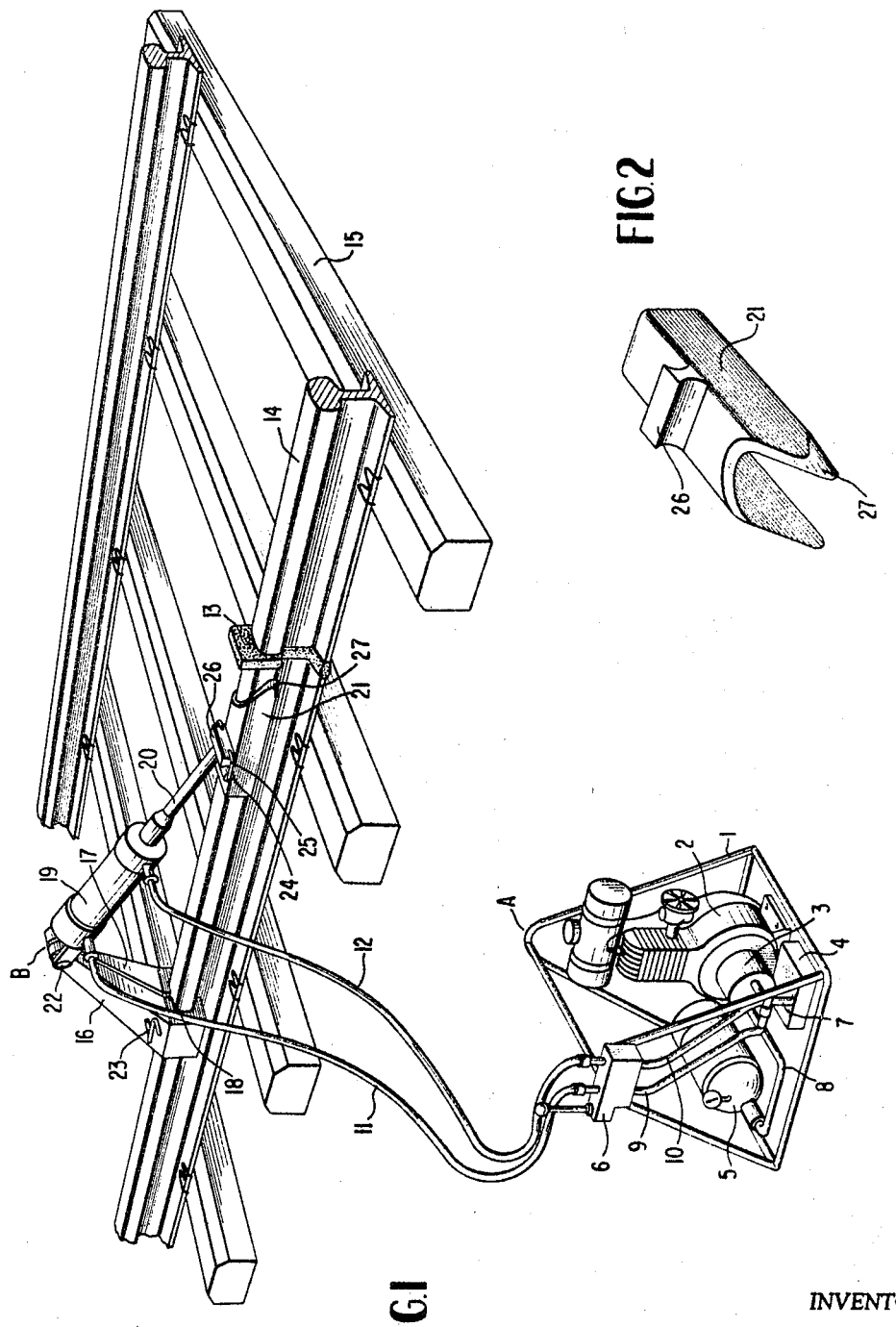
INVENTOR
WILHELM AHLERT
BY *James E. Bryan*
ATTORNEY

3,399,585
APPARATUS FOR REMOVING EXCESS WELDING MATERIAL FROM RAIL WELDS
Wilhelm Ahlert, Essen-Bredeney, Germany, assignor to Elektro-Thermit G.m.b.H., Essen, Germany, a corporation of Germany
Filed Mar. 14, 1966, Ser. No. 533,971
Claims priority, application Germany, Oct. 8, 1965, E 30,238
8 Claims. (Cl. 83—3)

ABSTRACT OF THE DISCLOSURE

A downwardly facing channel-shaped cutting tool has sloping cutting edges formed thereon. A power operated means has the piston rod thereof interconnected with an upper portion of the cutting tool and extends upwardly at an angle therefrom. The cylinder of the power operated means is pivotally connected with the upper portion of the clamping means clamped to an associated rail. A source of fluid under pressure for operating the power operated means includes a pump and a pressure storage reservoir as well as a control element for controlling operation of the apparatus.

---

This invention relates to apparatus for removing excess welding material from rail welds.

During the welding of joints between rails, performed in accordance with known welding processes, projections are produced at the welded joint, as a result of the compression of the rail ends and when welding using additional welding materials, such as in the aluminothermic welding of rails, the projections extending beyond the rail profile and being removed after welding in known manner either with a hammer and chisel or with compressed air-operated or electrically-operated chisel hammers. In the aluminothermic welding of rails, the rail ends to be welded are aligned, with a gap between them, after which a casting mold is placed around the ends of the rails and the ends are welded to each other, either with or without a preliminary heating thereof, using aluminothermically produced steel which is poured into the casting mold.

The known methods for removing the aforementioned projections or excess material involve disadvantages, particularly with respect to the amount of effort and the time required, especially as regards welds in rails where the rails are in use and where the removal must be effected as rapidly as possible so that the welded area can be traversed by a train as soon as possible after welding. These requirements and disadvantages impair the efficiency of the welding processes, more particularly of the aluminothermic welding process. The removal of the excess welding material by hand requires a great amount of physical effort and is very time consuming. Further, it involves, as does the use of compressed air-actuated chisel hammers, the danger that, as a result of faulty operation of the chisel, the rail is damaged by indentations made therein and the rigidity thereof is impaired. A further disadvantage is that the chisels, due to the fact that they are in contact with the red-hot steel for a considerable period of time, must be repeatedly cooled during the chiseling operation, which is, however, oftentimes neglected or insufficiently performed because of the time limitations, so that the chisels become unusable very rapidly. The removal of the excess welding material by means of compressed air-operated hammers during welding in the field furthermore involves the transportation of heavy compressed air cylinders or of bulky and heavy compressors.

Further difficulties arise in the known chiseling operations particularly due to the fact that the excess welding material above and to the sides of the rail tread must be successively removed and the total time required therefor is dependent primarily upon the manual dexterity of the workman. The result is that after the removal of the excess material above the rail tread, which generally is first performed, the excess material at the sides of the rail treads is already considerably colder so that the chiseling off of the latter becomes progressively more difficult due to the deformation resistance which increases at lower temperatures.

The present invention provides apparatus for removing the excess welding material produced during rail welding, and particularly excess welding material produced during aluminothermic rail welding, which eliminates the disadvantages described above, is independent of the manual skill of the workman, and, more particularly, requires only a fraction of the time required in the known methods of removing such material, which is of great importance for producing satisfactory rail welds. In the present invention, the removal is effected by means of a hydraulically-actuated cutting tool as a result of a single expansion of a hydraulic pressure reservoir charged with a pressure medium, i.e., the tool is forced through the excess material to be removed by a single stroke of a piston in the aforementioned hydraulic pressure reservoir.

The apparatus for performing the method of the invention comprises a hydraulically-actuated working cylinder and piston which may be clamped to the rail either by hand or pneumatically or hydraulically and the piston of which is connected to a cutting tool which conforms to the rail profile and is guided by the rail. The apparatus also includes a hydraulic pressure source which is connected to the working cylinder by means of suitable conduits and which also includes suitable control means as well as a hydraulic pressure reservoir, a pump, and a driving engine.

In a preferred embodiment of the apparatus of the present invention, the cutting tool extends in the longitudinal direction of the rail and encloses the rail tread. The tool has cutting edges on the sides thereof which describe a curve symmetrical to the longitudinal central plane of the tool with curve points being displaced in the direction of the longitudinal axis. The tool also includes an attachment means on the top thereof.

In the process of the present invention, the removal of the excess welding material is not effected by successive blows of a striking tool on the chiseling tool, as is the case in methods heretofore known, but instead by means of a continuously hydraulically-advanced cutting tool which is shaped to conform with the rail tread and is guided by the latter. The energy required is supplied by a hydraulic pressure reservoir in the form of a fluid medium under pressure. Pressure fluid acting upon the piston of the working cylinder thus makes possible the generation of pressure forces upon the tool having a magnitude such that a continuous and true to profile removal of the excess material is assured within a fraction of the time heretofore required for such removal. As a result of the brief contact time of the cutting tool with the red-hot excess material, the cutting edge of the tool is only insignificantly affected by the heat so that the edge of the tool is not dulled and the temper is not lost. Further, due to the completely automatic operation of the apparatus, any physical effort and requirements with regard to the mechanical ability of the workman are obviated. Further, due to the fact that sufficient time is available between two removal operations and since for the relatively short working stroke of the piston the entire pressure fluid stream is required for only a short period of time, the apparatus, and particularly the hydraulic driving means, may be maintained small with respect to the output obtained, both with regard to the weight of the apparatus and the exterior dimensions thereof which are particularly favorable as regards practical use of the apparatus.

One embodiment of the present invention is illustrated in the accompanying drawings in which:

FIGURE 1 is a perspective view of the apparatus of the present invention shown in the working position thereof, and FIGURE 2 is a perspective view of a cutting tool for the true to profile removal of excess welding material above and on the sides of a rail tread.

As shown in FIGURE 1, the apparatus includes a power assembly A and a working assembly B which are connected with each other by means of appropriate hose connections. The power assembly A, being supported in the frame 1, includes a small engine 2, for example a gasoline engine, a diesel engine or an electric motor, an oil pump 3 which is driven by the engine 2, an oil tank or reservoir 4, an oil pressure storage reservoir 5, a control member or element 6, and appropriate conventional regulating and safety devices. The oil pump 3 is connected with the oil tank or reservoir 4 and with the pressure reservoir 5, the latter being provided with a pressure gauge, by means of the lines 7 and 8, respectively. The pressure reservoir 5, as well as the oil tank or reservoir 4, are connected with a button- or lever-actuated control element 6, which latter effects control of the pressure oil supply stream and the return flow thereof through the lines 9 and 10.

The connection of the power assembly A with the working assembly B is effected by means of flexible oil pressure lines 11 and 12 connecting the control element 6 with the working cylinder of the working assembly B so that the power assembly A may be placed in any desired position with respect to the working assembly B, either within or outside of the rails.

The working assembly is positioned, as shown in FIGURE 1, in the working position thereof on the rail 14 of the track 15. The rail 14 has the excess material 13 which is to be removed. The working assembly includes a clamping device 18, which latter is composed of the clamping jaws 16 and 17 enclosing the rail tread and being clamped thereto, the working cylinder 19 with the piston rod 20, and the cutting tool 21.

The clamping jaws 16 and 17, constituting the clamping device 18, conform with the profile of the rail tread at their lower ends whereby they may be clamped to the rail 14 by means of the clamping bolt 23. The clamping device 18 is connected to the working cylinder 19 by means of a hinge 22 in a manner such that the longitudinal axis of the working cylinder 19 and of the rail 14 encloses an acute angle which is variable during the working stroke of the apparatus.

The connection between the working cylinder 19 and the cutting tool 21 is by means of the piston rod 20 having a cross member 24 at the end thereof, at which cross member there is mounted a yoke 25 which is rotatable about the longitudinal axis of the cross member 24. The cross member 24, as well as the yoke 25, enclose a ridge piece 26 which is mounted on the top of the cutting tool 21.

As shown in FIGURES 1 and 2, the cutting tool 21 for the removal of the excess material 13 above and to the sides of the tread of the rail 14 has a channel shape corresponding to the profile of the rail tread and the cutting edge 27 describes a curve which is symmetrical to the longitudinal central plane of the tool with curve points displaced in the direction of the longitudinal axis thereof. This curved configuration of the cutting edge 27 assures that, since the excess welding material 13 on the sides of the rail tread is first cut, beginning at the bottom thereof, the cutting tool 21 will not lift off of the tread of the rail 14 during the cutting operation and this effect is enhanced as a result of the direction of force applied in an angular manner with respect to the direction of movement of the cutting tool 21. Thus, the vertical component of the applied force presses the cutting tool 21 against the rail tread. In order to reduce the friction between the cutting tool 21 and the rail 14, the rail 14 is lubricated in the zone of sliding friction.

The method of the present invention is performed in a manner such that, during the preliminary heating of the rails to be welded and when they are enclosed in a casting mold, the working assembly B is so clamped to the rail 14, with the aid of the clamping jaws 16 and 17 and the clamping bolt 23, that the cutting edge 27 of the cutting tool 21 will be positioned closely adjacent the front of the casting mold. The pressure reservoir 5 is then charged with pressure oil by the motor actuated oil pump 3. When the required working pressure, which may be read on the pressure gauge, has been obtained, the motor 2 is turned off either manually or by an automatic control. After pouring alumino-thermically-produced steel into the casting mold, which steel melts and fuses the rail ends to each other and provides the excess welding material or weld metal, the working cylinder 19 is charged with high pressure oil, after a brief waiting period, by actuation of the control element 6. The piston rod 20, which connects with the cross member 24 behind the attachment or ridge piece 26 on the cutting tool 21, then forces the cutting tool 21 forward through the upper portion of the casting mold therby cutting off in a manner true to profile the excesses 13 of steel material to the sides and above the rail tread. Then, upon reversal of the control element 6, the pressure fluid is conveyed to the lower side of the working piston and the previously pressured upper side of the piston is relieved, by corresponding operation of the control mechanism, as a result of which the piston 20 and the cutting tool 21 are returned to the starting position thereof.

The removal of the excess welding material also may be effected after removal of the casting mold, as has been illustrated in FIGURE 1 for the sake of clarity. The advance of the cutting tool, after casting, through the casting mold results, however, in an additional saving of time which is advantageous when making welds in the short interval of time between passage of trains.

It will be obvious to those skilled in the art that many modifications may be made within the scope of the present invention without departing from the spirit thereof, and the invention includes all such modifications.

What is claimed is:

1. Apparatus for removing excess welding material from a rail weld comprising a downwardly facing cutting tool for enclosing a rail tread, cutting means on the cutting tool, power operated means including a first portion operatively connected with said tool and extending upwardly therefrom at an angle thereto, clamping means for securely clamping a portion of the apparatus to a rail with the clamping means extending upwardly from an associated rail, another portion of said power operated means being movably interconnected with a portion of said clamping means spaced above an associated rail.

2. Apparatus as defined in claim 1 wherein said other portion of the power operated means is pivotally interconnected with said clamping means.

3. Apparatus as defined in claim 1 wherein said power operated means comprises a fluid pressure operated mechanism, a source of fluid under pressure interconnected with said fluid pressure operated mechanism, and means for selectively controlling the flow of fluid under pressure from said source to said mechanism so as to operate the cutting tool in a continuous stroke.

4. Apparatus as defined in claim 3 wherein said source of fluid under pressure includes a fluid pressure storage reservoir means.

5. Apparatus as defined in claim 1 wherein said clamping means comprises a pair of clamping jaws having portions conforming with the profile of an associated rail tread for enclosing the rail tread when in clamping position.

6. Apparatus as defined in claim 1 wherein said cutting tool is of channel-shaped configuration and has cutting edges on three sides thereof.

7. Apparatus as defined in claim 6 wherein the cutting edges on the sides of the channel each describe a curve symmetrical to the longitiudinal central plane thereof with curve points displaced in the longitudinal direction.

8. Apparatus as defined in claim 6 wherein said tool has means on the top portion thereof for connecting said tool to said first portion of the power operated means.

References Cited

UNITED STATES PATENTS 2,124,849    7/1938    Drain _____ 90—24

FOREIGN PATENTS 992,789    5/1965    Great Britain.
1,374,279    8/1964    France.

ANDREW R. JUHASZ, *Primary Examiner.*